United States Patent
Fulton et al.

(10) Patent No.: US 10,982,614 B2
(45) Date of Patent: Apr. 20, 2021

(54) METHODS AND SYSTEMS FOR DETERMINING FUEL QUALITY

(71) Applicant: Ford Global Technologies, LLC, Dearborn, MI (US)

(72) Inventors: Brien Fulton, Bloomfield Hills, MI (US); Eric Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/934,805

(22) Filed: Mar. 23, 2018

(65) Prior Publication Data

US 2019/0293016 A1    Sep. 26, 2019

(51) Int. Cl.
| | |
|---|---|
| F02D 41/24 | (2006.01) |
| F02D 41/34 | (2006.01) |
| F02D 19/06 | (2006.01) |
| F02D 41/00 | (2006.01) |
| F02D 41/06 | (2006.01) |

(Continued)

(52) U.S. Cl.
CPC ..... *F02D 41/2454* (2013.01); *F02D 19/0628* (2013.01); *F02D 19/085* (2013.01); *F02D 41/0042* (2013.01); *F02D 41/064* (2013.01); *F02D 41/345* (2013.01); *B60W 30/18* (2013.01); *F02D 2200/022* (2013.01); *F02D 2200/0612* (2013.01)

(58) Field of Classification Search
CPC ............... F02D 41/2454; F02D 41/064; F02D 41/0042; F02D 41/345; F02D 41/0025; F02D 41/224; F02D 2041/228; B60W 2560/00; B60W 2560/02; B60W 2560/04; B60W 2560/06; B60W 30/18; B60W 2530/00; B60W 2530/209; B60W 2530/211; B60W 2530/213
See application file for complete search history.

(56) References Cited

U.S. PATENT DOCUMENTS

| | | | |
|---|---|---|---|
| 8,232,898 B2 * | 7/2012 | Bai | H04L 67/12 340/991 |
| 8,442,744 B2 * | 5/2013 | Kurtz | F02D 41/005 701/104 |

(Continued)

FOREIGN PATENT DOCUMENTS

| | | |
|---|---|---|
| EP | 2038674 B1 | 4/2010 |
| WO | 2008007007 A1 | 1/2008 |
| WO | 2016135532 A1 | 9/2016 |

OTHER PUBLICATIONS

"Fuel-Testers: A Division of MLR Solutions—Test Gas to Protect Your Engines From Unnecessary Ethanol Damage," Fuel-Testers Website, Available Online at http://www.fuel-testers.com/, Available as Early as Jul. 3, 2007, 2 pages.

(Continued)

*Primary Examiner* — Hung Q Nguyen
*Assistant Examiner* — Susan E Scharpf
(74) *Attorney, Agent, or Firm* — Geoffrey Brumbaugh; McCoy Russell LLP

(57) ABSTRACT

Methods and systems are provided for calculating a fuel aging of fuel in a fuel tank. In one example, a method may include alerting a vehicle operator and/or adjusting engine operating parameters in response to a fuel aging being greater than a threshold aging.

6 Claims, 8 Drawing Sheets

(51) Int. Cl.
   *F02D 19/08*      (2006.01)
   *B60W 30/18*      (2012.01)

(56) References Cited

U.S. PATENT DOCUMENTS

| | | | | |
|---|---|---|---|---|
| 8,694,186 | B2* | 4/2014 | Syed | F02D 41/0025 |
| | | | | 701/22 |
| 8,712,627 | B2* | 4/2014 | Cummings | B60K 15/00 |
| | | | | 340/995.14 |
| 8,897,991 | B2* | 11/2014 | Geng | F02D 41/0025 |
| | | | | 123/1 A |
| 8,966,966 | B2 | 3/2015 | Ballauf | |
| 9,328,674 | B2* | 5/2016 | Geveci | F02D 41/2438 |
| 2010/0191439 | A1* | 7/2010 | Fabien | B60W 10/06 |
| | | | | 701/103 |
| 2010/0256931 | A1* | 10/2010 | Proefke | G01N 33/2835 |
| | | | | 702/55 |
| 2012/0198911 | A1* | 8/2012 | Ballauf | F02D 19/0665 |
| | | | | 73/23.31 |
| 2013/0144519 | A1* | 6/2013 | Nakano | B60K 15/00 |
| | | | | 701/123 |
| 2014/0107906 | A1* | 4/2014 | Jentz | F02M 37/0088 |
| | | | | 701/102 |
| 2017/0088124 | A1* | 3/2017 | Amin | B60W 20/18 |

OTHER PUBLICATIONS

"The list of ethanol-free gas stations in the U.S. and Canada," Pure-Gas Website, Available Online at https://www.pure-gas.org/, Available as Early as Aug. 4, 2009, 1 page.

"USA Fuel Price," Google Play Website, Available Online at https://play.google.com/store/apps/details?id=com.app.usagasoline &hl=en_US, Available as Early as Jan. 18, 2015, 3 pages.

Kurtz, E., "System and Method for Starting a Diesel Engine," U.S. Appl. No. 15/664,751, filed Jul. 31, 2018, 34 pages.

\* cited by examiner

METHODS AND SYSTEMS FOR DETERMINING FUEL QUALITY

FIELD

The present description relates generally to determining fuel quality and fuel age of fuel in a fuel tank.

BACKGROUND/SUMMARY

Vehicle fuel economy, as well as performance, may be dependent on fuel quality. Several factors may determine fuel quality, including but not limited to one or more of vendor fuel quality, time fuel spends in a fuel tank, and conditions of the fuel tank. As an example, fuel aging (e.g., fuel sitting in the fuel tank) may decrease fuel quality, thereby decreasing vehicle fuel economy and performance, and impacting engine and component durability.

Other attempts to address fuel quality include consuming old fuel prior to consuming new fuel. One example approach is shown by Ballauf in U.S. Pat. No. 8,966,966. Therein, fuel currently in the fuel tank does not mix with fuel from a fuel refilling event. Upon a subsequent engine start, the two fuels are sequentially provided to the engine, wherein the quality of each of the fuels is estimated. If the fuels are determined to be of different quality, then the fuel in the fuel tank prior to the fill-up is consumed before the fuel from the fuel refilling event.

However, the inventors herein have recognized potential issues with such systems. As one example, the system of Ballauf demands an extra fuel tank and a fuel reservoir to hold and separate fuel. This may increase packaging restraints in a vehicle. Additionally, both the fuel tank and the fuel reservoir may demand their own network of pumps, valves, and passages fluidly coupling them to the engine and/or a fuel system. This may not only increase vehicle manufacturing costs, but may also introduces an increased number of components which may degrade over time. Lastly, it may be challenging to determine if fuel quality differences measured between the two fuels are a result of quality differences or degradation of one or more combustion chamber components. This may lead to improper fuel quality diagnosis.

In one example, the issues described above may be addressed by a method alerting a vehicle operator to adjust driving behavior and adjusting one or more engine operating parameters in response to an estimated fuel aging being greater than a threshold fuel aging. In this way, fuel comprising a fuel aging greater than the threshold fuel aging may be consumed more quickly.

As one example, adjusting one or more engine operating parameters includes decreasing an air/fuel ratio, increasing fuel injection volume, and increasing engine speed prior to a gear shift. Each of these adjustments may allow the engine to consume more fuel, which may decrease fuel economy. However, fuel aged over the threshold aging may present certain combustion difficulties, such as inaccurate air/fuel ratios, decreased combustion stability, reduced power output, and the like. As such, it may be desirable to decrease fuel economy in an effort to consume the fuel aged over the threshold fuel aging more rapidly. Additionally or alternatively, the vehicle operator may be alerted to adjust their driving behavior to assist in the consumption of fuel. The alerting includes one or more of displaying a message via an infotainment system, sending a text to a cellular device belonging to the vehicle operator, calling the cellular device belonging to the vehicle operator, and emailing the vehicle operator. The instructions to the vehicle operator may include directions to perform one or more of harder tip-ins, higher engine RPM prior to gear change, and driving farther. Harder tip-ins may include tip-ins where the accelerator pedal is more depressed.

Alerting the vehicle operator may further comprise instructing the vehicle operator to perform a fuel tank fill-up. This may further include providing a list of nearby fuel stations. The vehicle operator may select one of the displayed fuel stations via an infotainment system or their cellular device. In response to the selection, the vehicle may display directions to the selected fueling station.

The alerting may further comprise instructing the vehicle operator to dispense at least one of a plurality of fuel additives to a fuel tank. This may further include providing a list of nearby locations selling at least one of the plurality of fuel additives. The vehicle operator may select a location and in response, the vehicle may provide directions to the selected location.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
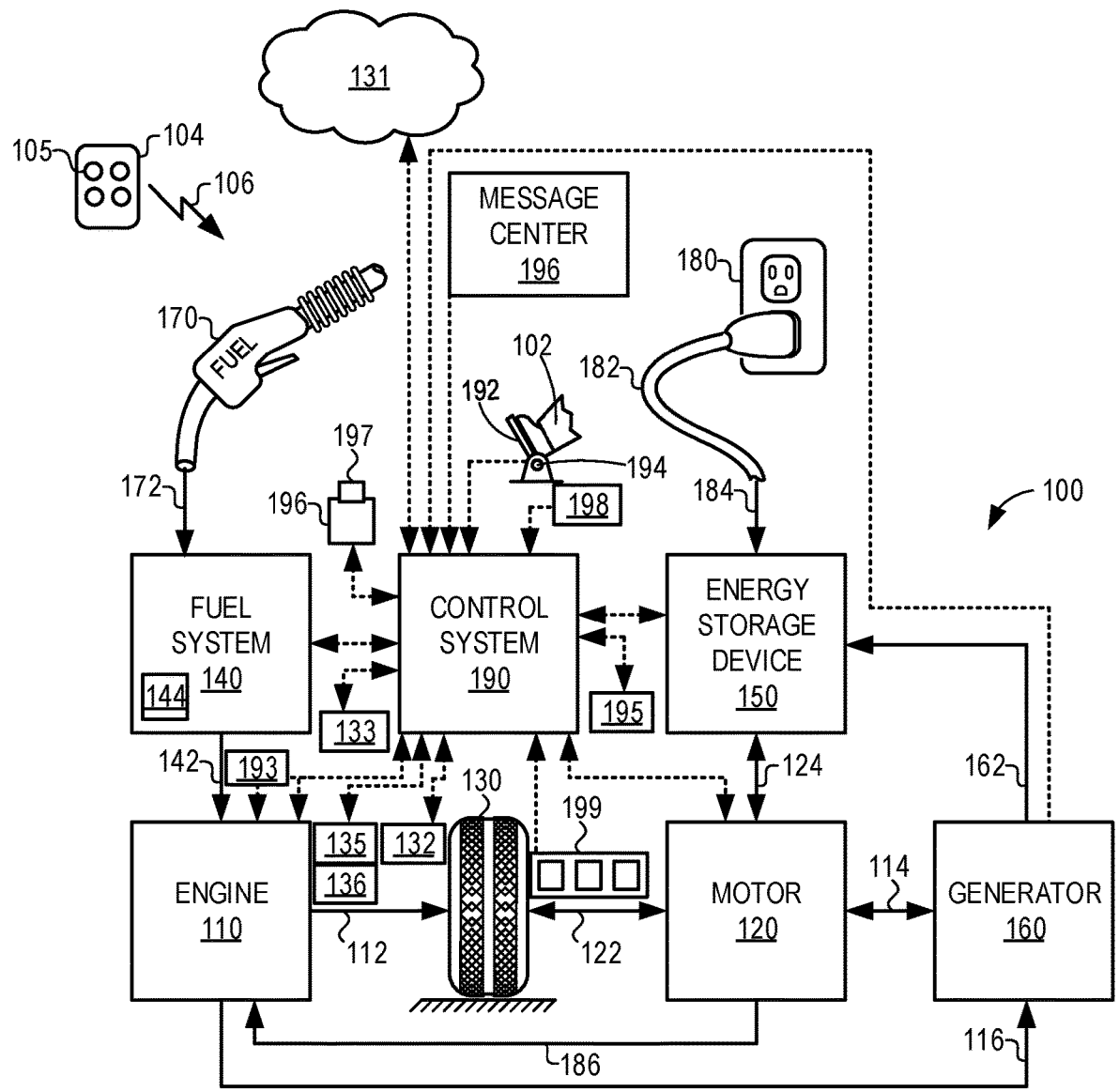
FIG. 1 schematically shows an example vehicle propulsion system.
Figure 2:
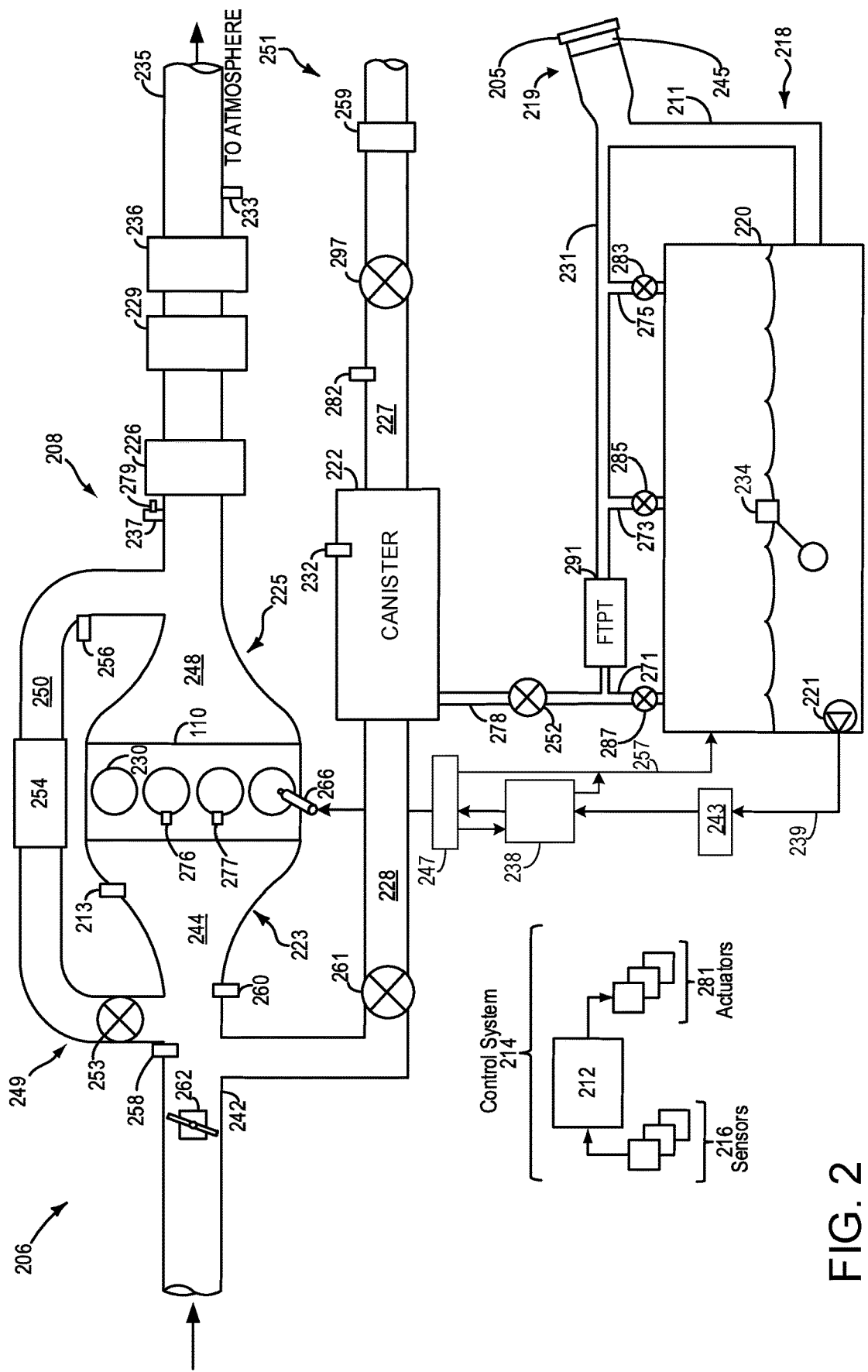
FIG. 2 schematically shows an example vehicle system with a fuel system.
Figure 3:
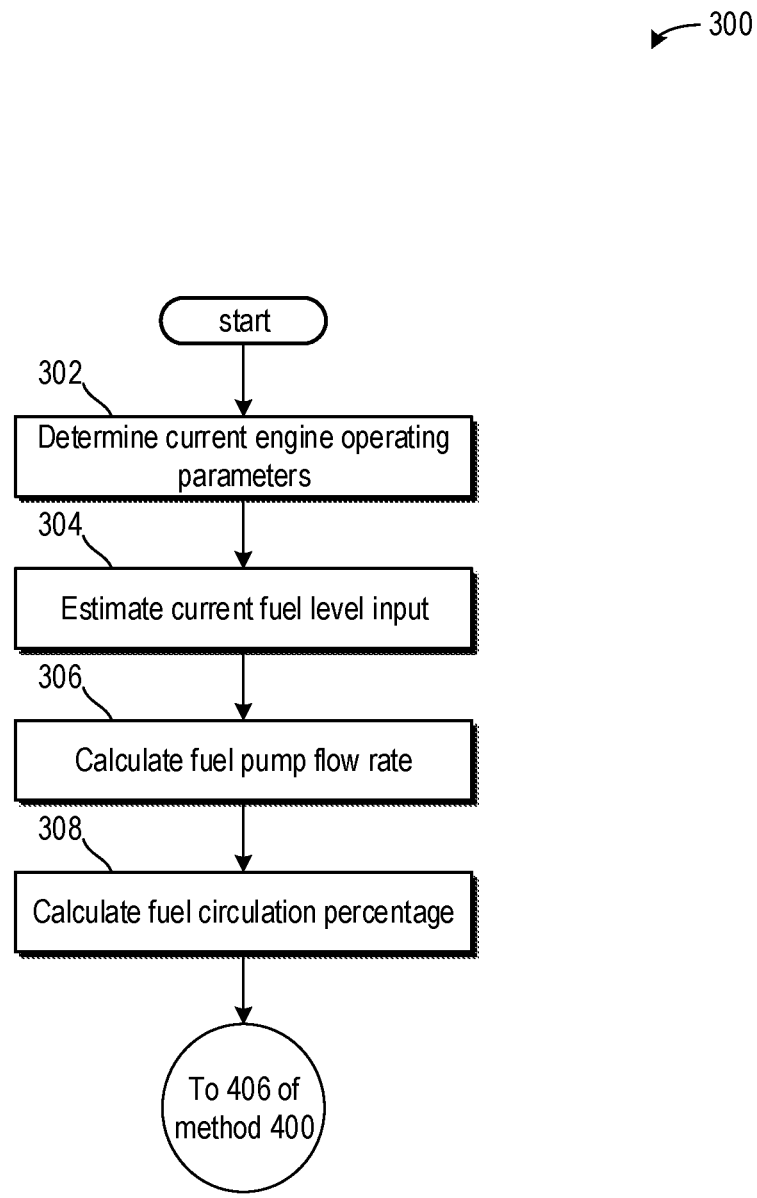
FIG. 3 shows a method for determining a fuel circulation percentage.
Figure 4:
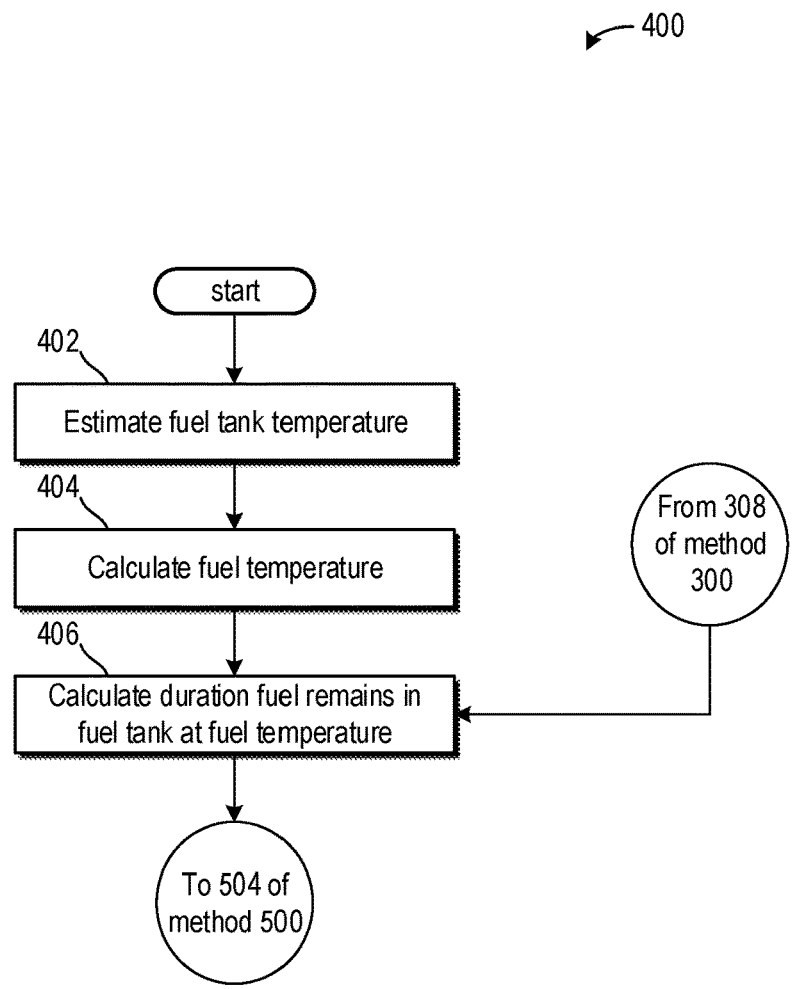
FIG. 4 shows a method for estimating a duration and a temperature a portion of fuel remains in the fuel tank.
Figure 5:
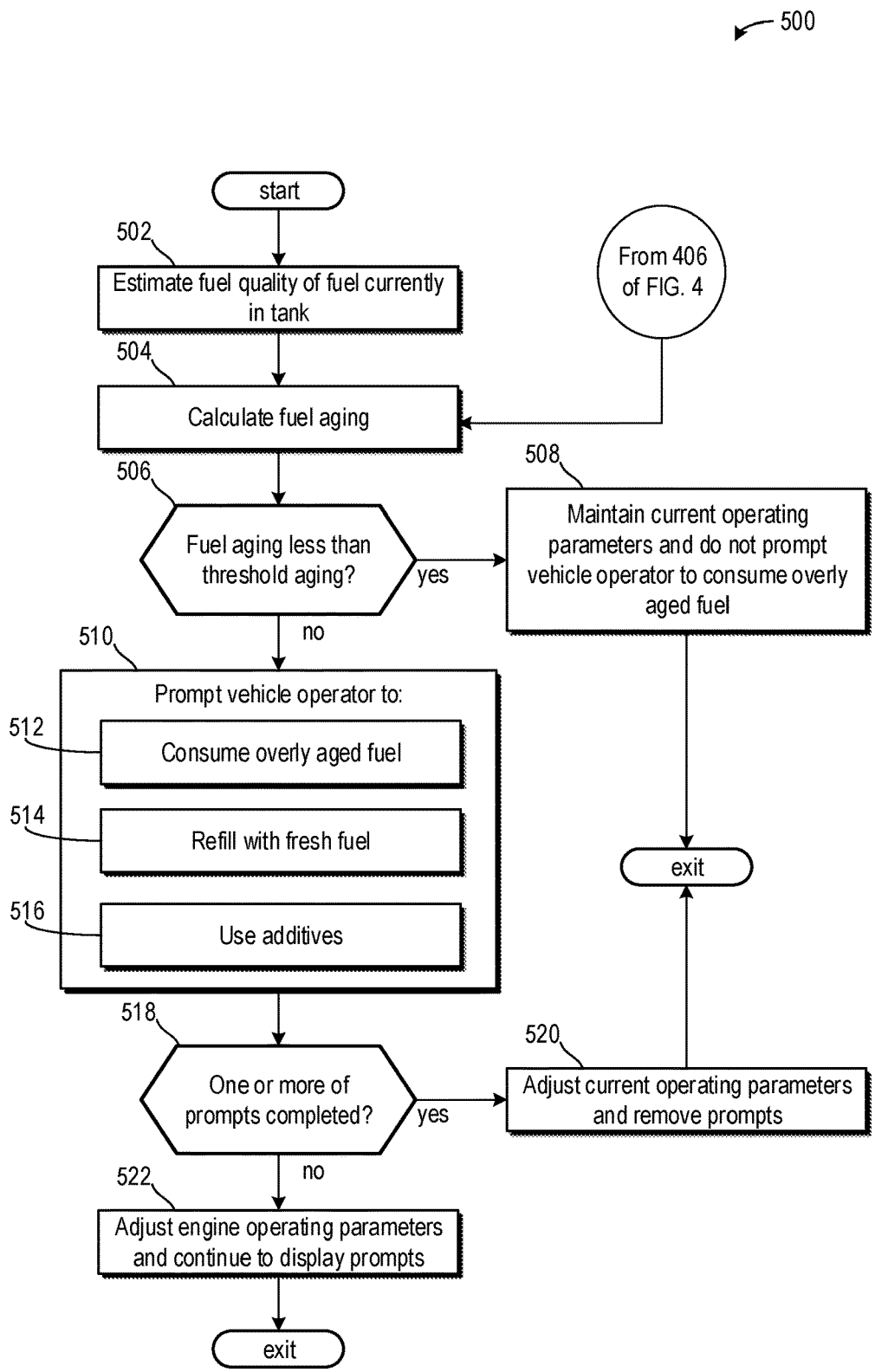
FIG. 5 shows a method for estimating a fuel aging.
Figure 6:
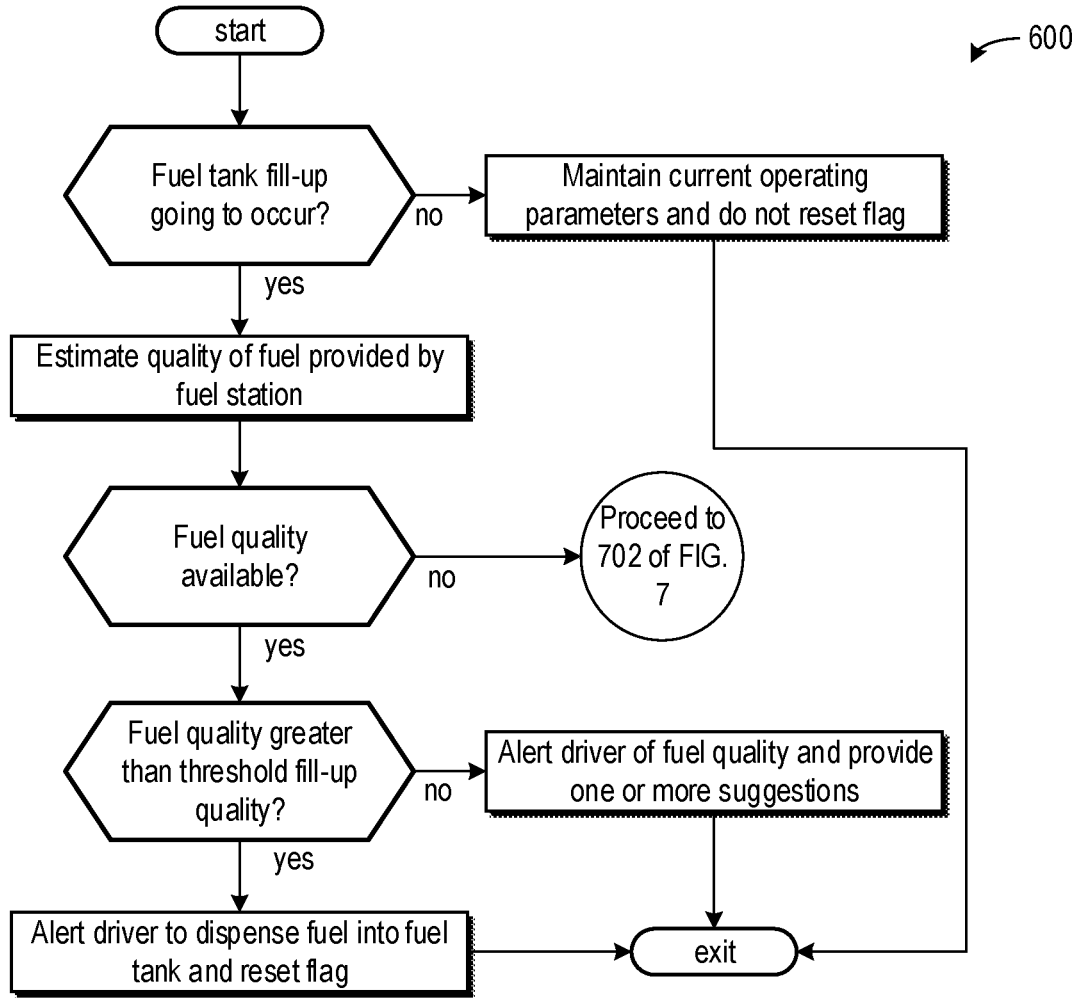
FIGS. 6 and 7 show methods for determining a quality of fuel provided to a vehicle during a fuel fill-up event.

The following description relates to systems and methods for estimating fuel aging in a fuel tank. The fuel aging may take into account an initial quality of fuel dispensed into the fuel tank based on information provided by a fuel station. FIG. 1 illustrates an example of a vehicle propulsion system comprising the components desired to communicate with the fuel station or the like. An example engine schematic of an engine configured to be used in the propulsion system of FIG. 1 is illustrated in FIG. 2. FIGS. 3-5 illustrate various methods for determining different fuel quality characteristics. FIG. 6 illustrates a method for determining an initial fuel quality of fuel dispensed into the fuel tank. If the initial fuel quality of fuel dispensed into the fuel tank is not provided by a fuel station and/or information regarding previously determined fuel qualities from other drivers is not available via the internet, then the method of FIG. 7 may be executed to determine the fuel quality onboard. FIG. 8 shows an engine operating sequence graphically illustrating the methods of FIGS. 3 to 5.

FIG. 2 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

In another example, the engine may be equipped with a start/stop (S/S) feature 193, wherein the engine 110 may be automatically shut down during times when the vehicle is not moving, or when the vehicle speed is below a threshold speed, when engine speed is below a threshold engine speed, etc. Control system 190 may be connected to engine 110 and S/S feature 193, for performing the start-stop functions. Advantages to the S/S functionality may include an improvement in fuel economy over other vehicles that do not employ such technology.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate engine unfueled in a forward (e.g. default orientation) or reverse orientation, using energy provided via energy storage device 150, exemplified by arrow 186.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine. Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. The engine system 208 may include an engine 110 having a plurality of cylinders 230. The engine 110 includes an engine air intake system 223 and an engine exhaust system 225. The engine air intake 223 includes a throttle 262 in fluidic communication with engine intake manifold 244 via an intake passage 242. In some examples, throttle 262 may comprise an electronic throttle. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The exhaust passage may lead to one or more exhaust after-treatment devices (e.g. 226, 229, 236).

The exhaust after-treatment devices may be disposed in various orders and/or combinations along exhaust passage 235. For example, a diesel oxidation catalyst (DOC) 226 may be followed downstream by a selective catalytic reduction (SCR) catalyst 229. SCR catalyst 229 may be followed downstream by a diesel particulate filter (DPF) 236. It should be understood that the emissions control devices of the exhaust system 225 shown in FIG. 2 are exemplary in nature. Various other emission control devices and configurations may be included in engine exhaust system 225. For example, exhaust system 225 may include an SCR catalyst followed by a DPF only. In another example, the exhaust system 225 may only include an SCR catalyst. In still another example, a DPF may be located upstream of the SCR catalyst, or a combined DPF/SCR catalyst may be used.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. In another example, an intake temperature sensor 260 may be positioned in the intake. In yet another example, a humidity sensor 258 may be positioned in the intake.

Engine system 208 may also include an exhaust gas recirculation (EGR) system 249 that receives a portion of an exhaust gas stream exiting engine 110 and returns the exhaust gas to engine intake manifold 244 downstream of throttle 262. Under some conditions, EGR system 249 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 249 is shown forming a common EGR passage 250 from exhaust passage 235 to intake passage 242.

In some examples, exhaust system 225 may also include a turbocharger (not shown) comprising a turbine and a compressor coupled on a common shaft. The turbine may be coupled within exhaust passage 235, while the compressor may be coupled within intake passage 242. Blades of the turbine may be caused to rotate about the common shaft as a portion of the exhaust gas stream discharged from the engine 110 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 110. In systems where EGR passage 250 is coupled to engine exhaust 225 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system).

An EGR valve 253 may be coupled within EGR passage 250. EGR valve 253 may be configured as an active solenoid valve that may be actuated to allow exhaust gas flow into intake manifold 244. The portion of the exhaust gas flow discharged by engine 110 that is allowed to pass through EGR system 249 and return to engine 110 may be metered by the measured actuation of EGR valve 253, which may be regulated by controller 212. The actuation of EGR valve 253 may be based on various vehicle operating parameters and a calculated overall EGR flow rate.

One or more EGR coolers 254 may be coupled within EGR passage 250. EGR cooler 254 may act to lower the overall temperature of the EGR flow stream before passing the stream on to intake manifold 244 where it may be combined with fresh air and directed to engine 110.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. Furthermore, in a case where the vehicle system 206 comprises a vehicle that uses diesel fuel, a glowplug 276 may be included for each cylinder 266. The glowplug 276 may comprise heating devices that may aid in starting diesel engines. Alternatively, in an example where the vehicle system 206 comprises a vehicle that runs on fuel other than diesel, a spark plug 277 may be included for each cylinder 266. It will be appreciated that fuel system 218 may be a return fuel system or various other types of fuel systems. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

The fuel pump system 221 may be a low-pressure pump system configured to direct fuel from the fuel tank to a high-pressure fuel pump system 238. A fuel passage 239 fluidly couples the low-pressure pump system 221 to the high-pressure fuel pump system 238. A filter 243 may be arranged along the fuel passage 239 between the low- and high-pressure fuel pump systems 221 and 238, respectively. The filter 243 may be configured to separate water from fuel such that a water content in the fuel is decreased once it reaches the high-pressure fuel pump system 238. The high-pressure fuel pump 238 may direct fuel to a fuel rail 247, wherein the fuel may be directed to one or more fuel injectors based on a fuel-pulse width or other signaling. If the fuel in the fuel rail 247 is not commanded by the engine, then the fuel in the fuel rail 247 may be returned to the fuel tank via return passage 257. The high-pressure fuel from the return passage may mix with the low-pressure fuel in the fuel tank 220. Furthermore, a water content of the fuel returning to the fuel tank 220 may be less than a water content of fuel in the fuel tank 220. As such, circulating fuel via the passage 239 may increase a fuel quality, or at the least decrease its water content. As illustrated, the high-pressure fuel pump 238 may also feed fuel into the return passage 257 without flowing the fuel to the fuel rail 247.

Methods are illustrated below for estimating a fuel aging based on a circulation of fuel from the fuel tank to the high-pressure fuel pump system 238. The fuel aging may be dependent on a flow rate of the low-pressure fuel pump system 221. As fuel sits in the fuel tank for a greater duration of time and does not flow through the passage 239, its fuel age may increase, thereby indicating a reduction in fuel quality.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, temperature sensor 260, pressure sensor 291, pressure sensor 282, and canister temperature sensor 232. Exhaust gas sensor 237 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 237 may be connected with controller 212. It may be understood that the exhaust gas sensor 237 may work effectively when heated to approximately 600° F. Accordingly, in some examples the exhaust gas sensor may include heating elements 279, to enable rapid warming of the exhaust gas sensor.

Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines.

Turning now to FIG. 3, it shows a method for determining a fuel circulation percentage. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The method 300 begins at 302, where the method 300 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 300 may proceed to 304, where the method 300 may include estimating a current fuel level input. The current fuel level input may refer to a current amount of fuel arranged in the fuel tank (e.g., fuel tank 220 of FIG. 2). Thus, in some embodiments, the current fuel level input may not include fuel in fuel passages outside of the fuel tank. In one example, the current fuel level input refers to only an amount of fuel currently residing in the fuel tank.

The method 300 may proceed to 306 where the method 300 may include calculating a fuel pump (e.g., fuel pump system 221 of FIG. 2) flow rate. In some embodiments, a controller may signal to the fuel pump in the fuel tank to flow fuel from the fuel tank to the fuel passages outside of the fuel tank. The fuel pump flow rate may be determined via a signal provided by the controller to the fuel pump. Additionally or alternatively, there may be a fuel flow rate sensor arranged in a fuel passage downstream of the fuel pump, wherein feedback from the fuel flow rate sensor to the controller may provide an estimation of a fuel pump flow rate.

The method 300 may proceed to 308 where the method 300 may include calculating a fuel circulation percentage. This may be based on an amount of fuel being pumped out of the fuel tank, through fuel passages, and into the fuel rail relative to an amount of fuel not being pumped out of the fuel tank, wherein the fuel pumped into the fuel rail does not include fuel consumed by the engine. As an example, if the current fuel level input is 20 L, and a current fuel pump flow rate is 0.1 L/min, then a fuel circulation percentage may be 0.5% of fuel being circulated each minute if no fuel is being consumed by the engine.

Additionally or alternatively, the method 300 may further track an amount of time elapsed since a previous fuel tank fuel fill-up. A flag may be set at a fuel fill-up, wherein time is tracked from the flag to a subsequent fuel tank fill-up. The fuel tank fill-up may be a partial fill-up or a complete fill-up without departing from the scope of the present disclosure. The time elapsed may be divided by the fuel circulation percentage. Continuing with the example above, if the time elapsed since the previous refill is 180 minutes and the fuel recirculation percentage is 0.5% per minute, then a fuel recirculation status may be 0.9%. Thus, the fuel recirculation status refers to an amount of fuel in the fuel tank which has been circulated since the previous fuel fill-up.

Turning now to FIG. 4, it shows a method 400 for determining conditions of fuel in the fuel tank. The method 400 begins at 402 where the method 400 includes estimating a fuel tank temperature. The fuel tank temperature may be determined via a temperature sensor arranged in one or more of the fuel tank or a fuel passage configured to receive fuel from the fuel tank. As an example, the temperature sensor may be arranged in the fuel tank, wherein feedback from the temperature sensor may provide an indication as to the temperature of the fuel tank. The temperature sensor may be submerged in the fuel or arranged in a portion of the fuel tank above a surface of the fuel such that the fuel may not touch the temperature sensor. Additionally or alternatively, the temperature sensor may be arranged in a fuel passage arranged between the fuel tank and a fuel rail and/or between the fuel rail and a fuel injection system of the engine. At any rate, feedback from the temperature sensor in combination with data stored in a multi-input look-up table may be used to determine the fuel tank temperature.

The method 400 may proceed to 404, where the method 400 may include calculating a fuel temperature based on the fuel tank temperature. As such, the fuel temperature may be extrapolated based on a combination of feedback from the temperature sensor described at 402 and information stored in a multi-input look-up table.

The method 400 may proceed to 406, where the method may include calculating a duration fuel remains in the fuel tank at a fuel temperature. This may be calculated in combination with the fuel recirculation status determined above. As an example, the fuel recirculation status is combined with the fuel temperature of fuel in the fuel tank to calculate how long fuel has been arranged in the fuel tank without being circulated at a given temperature. In some examples, the fuel temperature may change over the time elapsed such that the fuel temperature increases or decreases as time is measured between fuel tank fill-ups.

Turning now to FIG. 5, it shows a method for determining a fuel aging and providing one or more prompts to a vehicle operator, if desired, based on the aging. The method 500 begins at 502 where the method 500 includes estimating a quality of fuel currently in the fuel tank. The quality of fuel may correspond to an amount of fuel in the fuel tank that has not been circulated out of the fuel tank. The quality of fuel may take into consideration a starting quality of fuel, wherein the starting quality of fuel corresponds to a quality of fuel provided by a fuel station during a fuel tank fill-up.

In some embodiments, the fuel station may provide information regarding its quality of fuel via an RFID, Wi-Fi, and email. Additionally or alternatively, the fuel station may display information regarding its quality of fuel to a vehicle operator, upon which the driver may input the information into an infotainment system of the vehicle. Information regarding the quality of fuel may include cetane concentrations, octane concentrations, water concentrations, temperature, and the like.

Additionally or alternatively, if the fuel station does not comprise information regarding the quality of its fuel, the vehicle may access a central data storage system wherein a plurality of vehicle may communicate with the central data storage system. In one example, the central data storage system is a cloud. As such, the central data storage system may receive information from drivers which have previously received fuel from the fuel station regarding a quality of the fuel. Determining a quality of fuel onboard a vehicle is described in greater detail in method 700 of FIG. 7. Once the quality of fuel is determined, the information may be relayed to the central data storage system, which may then be forwarded to other vehicles receiving fuel from the fuel station.

The method 500 may proceed to 504 where the method 500 may include calculating a fuel aging. The fuel aging may be calculated based on a combination of the fuel quality and the duration and temperature in which fuel remains in the fuel tank without being circulated. In one example, the fuel aging may be adjusted based on one or more of the fuel quality, duration, and temperature. For example, if the fuel quality decreases, then the fuel aging may increase. That is to say, if an initial quality of fuel is relatively low, then fuel aging may occur more rapidly. As another example, as the duration in which fuel remains in the fuel tank uncirculated increases, then the fuel aging may correspondingly increase. As another example, as the temperature increases, fuel aging may also increase. This may be due to water condensate collecting in the fuel tank as the fuel temperature increases. If the fuel is not circulated into fuel passages outside of the fuel tank, the water and/or other impurities may sit in the fuel, thereby reducing an overall quality of the fuel and increasing the fuel aging.

The method 500 may proceed to 506 where the method 500 includes determining if a fuel aging of the fuel which has not been circulated out of the fuel tank is less than a threshold aging. In some examples, the threshold aging may be based on an aging of the fuel wherein the fuel age may result in decreased fuel economy, decreased combustion stability, decreased power output, or the like. If the fuel aging is less than the threshold aging, then the method 500 may proceed to 508 to maintain current operating parameters and does not prompt a vehicle operator to consume the overly aged fuel.

If the fuel aging is not less than the threshold aging, then the method 500 may proceed to 510 to prompt a vehicle operator to do one or more of consume the overly aged fuel at 512, refill with fresh fuel (e.g., perform a fuel fill-up) at 514, and use additives at 516. Consuming the overly aged fuel may include prompting to the vehicle operator to continue driving to allow the vehicle to consume the overly aged fuel. This prompt may additionally include instructing the vehicle operator to drive under engine conditions where fuel economy is low. For example, the prompt may include instructions to perform more aggressive tip-ins, increase engine speed (RPM) before changing gears, and the like. Refilling with fresh fuel may include alerting a vehicle operator that fuel aging is not less than the threshold aging and that dilution of the overly aged fuel is desired. Furthermore, the prompt may include a list of nearby gas stations wherein a quality of fuel of the gas stations is known. In some example, gas stations where the quality of fuel is unknown may also be displayed. If the vehicle operator selects one of the gas stations, directions may be displayed. Lastly, prompting the vehicle operator to add one or more additives to the fuel tank may include various types of additives. Additionally or alternatively, a list of various locations which sell the additives may be displayed. Upon selection of one of the locations, directions may be displayed. It will be appreciated that each of the prompts may be displayed on one or more screens of a vehicle, including an infotainment screen, navigation system, and dashboard screen. Additionally or alternatively, an email, phone call, or text may be sent to the vehicle operator wherein the prompts are included.

The method 500 may proceed to 518 where the method 500 may include determining if one or more of the prompts is completed. It may be determined that one or more of the prompts are completed if the fuel aging is no longer greater than or equal to the threshold aging. Additionally or alternatively, a new flag may be set following refilling with fresh fuel, thereby indicating that a prompt has been completed. If one or more of the prompts has been completed then the method 500 may proceed to 520 where the method 500 may include adjusting current operating parameters and removes the prompts. In some examples, a prompt may be displayed to the vehicle operator indicating that the fuel aging is now less than the threshold aging.

In some examples, the adjusting may include bolstering the changed driver behavior such that more fuel is consumed. That is to say, if the vehicle operator adjusted their driving behavior to consume more fuel at a first rate (e.g., harder tip-ins, more braking, etc.), then the method may further include adjusting one or more engine operating parameters of a hybrid-electric drive system to consume fuel at a second rate, wherein the second rate is greater than the first rate.

For example, if the vehicle is a plug-in hybrid vehicle (e.g., vehicle propulsions system 100 of FIG. 1), wherein an energy storage device (e.g., energy storage 150 of FIG. 1) of the vehicle is replenished by the vehicle operator via an outlet, then the vehicle may prioritize consumption of energy from the energy storage device over fuel consumption during engine operating conditions where a fuel aging is not greater than the threshold aging. This may include steadier engine rotations-per-minute (RPM) during transient conditions by assisting the engine via an electric motor, the electric motor being configured to receive power from the energy storage device, thereby decreasing a state-of-charge (SOC) of the energy storage device. Steadier engine RPM may include the engine RPM being maintained within a range (e.g., 1000 to 4000 RPM) to provide a higher fuel economy compared to a varying engine RPM, wherein the varying engine RPM may fluctuate between 1000 to 9000 RPM. However, if the fuel aging is greater than the aging threshold, then the controller may signal to one or more actuators to adjust one or more engine operating parameters to further increase fuel consumption in combination with the changed driving behavior. This may provide a synergistic benefit to solving the technical problem of quickly consuming the old fuel in that the driver's increased aggressiveness is complemented by a similar increase in the aggressiveness of engine operation, even though the vehicle still follows the drive commands. For example revving engine sounds of the increased engine RPM transients may complement the driver's more aggressive driving, while further increasing usage of the stale fuel.

One such adjustment may include adjusting a prioritization of energy consumption such that fuel consumption is prioritized over electrical energy consumption. As an example, this may include adjusting a threshold SOC limit of the energy storage device such that the threshold SOC limit is increased relative to a driving condition where fuel consumption is not increased. In some examples, a first threshold SOC limit corresponds to a SOC limit where electrical energy consumption is prioritized, the first threshold SOC limit may be less than 5%, meaning that almost, if not, all of the energy of the energy storage device may be consumed. A second threshold SOC limit corresponds to a SOC limit where fuel consumption is prioritized, the second threshold SOC limit being greater than 50%, meaning that the controller may prevent electrical energy consumption over half the capacity of the energy storage device. By doing this, engine RPM may vary more greatly during transient engine conditions (e.g., tip-in) than if only vehicle operator behavior was adjusted. For example, if only vehicle operator behavior is adjusted, then the engine RPM may approach an upper end of the steady engine RPM range (e.g., 3500 RPM), but if both vehicle operator behavior and engine operating conditions are adjusted, then the engine RPM may approach an upper end of the varying engine RPM range (e.g., 8000 RPM). Additionally, the engine RPM may undulate from the upper end to the lower end of the varying engine RPM during transient conditions to further consume the overly aged fuel. As an example, the vehicle operator may begin to tip-in more aggressively, wherein in response to the more aggressive tip-in, the electric motor may not assist or may assist less during the tip-in, such that engine load increases and power output is less metered such that engine RPM also increases, thereby increasing fuel consumption.

As another example, regeneration of the energy storage device may be adjusted to increase fuel consumption. A load on the engine may increase by utilizing the engine to regenerate the energy storage device, even when a regeneration is not demanded. Thus, a portion of engine power output may increase higher than a power output corresponding to a current driver demand. Additionally or alternatively, the energy storage device may not be providing power to the electric motor or other electrical device. Furthermore, if the energy storage device is fully charged and the engine attempts to regenerate the energy storage device, the energy provided by the engine to the energy storage device may be lost as waste heat. As a further example, regenerative braking schemes may be delayed or altered such that braking is not regenerative. This may result in increased fuel consumption due to heat generated due to braking being lost as waste heat.

In this way, engine torque output may be increased and electric motor torque output may be decreased, thereby resulting in increased fuel consumption. This in combination with more aggressive driving behavior and adjusted engine operating parameters corresponding with decreased fuel economy may result in a more rapid consumption of overly aged fuel.

If one or more prompts has not been completed or if the fuel aging is still greater than or equal to the threshold aging following completion of one or more of the prompts, then the method 500 may proceed to 522 where the method may include adjusting one or more engine operating parameters and continuing to display the prompts. Adjusting one or more engine operating parameters may include increasing a fuel pump flow rate, increase a fuel injection volume, decreasing an air/fuel ratio, increasing canister purge, and the like. As an example, the method may determine that fuel aging is greater than or equal to (e.g., not less than) the threshold aging, wherein the method may signal to increase canister purge to increase fuel quality. In some examples, the fuel tank and/or components of the fuel passages of the fuel tank and fuel rail may be determined to be degraded. In response, an indicator lamp may be activated indicating to the vehicle operator that service may be desired. It will be appreciated that in some examples of the method 500, the one or more adjustments to the engine operating parameters may be conducted in conjunction with the prompts being displayed to the vehicle operator at 510. That is to say, the method may executed one or more engine adjustments without completion of one or more of the prompts.

As an example, where the vehicle is a plug-in hybrid vehicle (e.g., vehicle propulsion system 100 of FIG. 1), the adjustments may include prioritizing fuel consumption over electrical energy consumption of an energy storage device, similar to the example demonstrated at 520. However, due to vehicle operator behavior remaining substantially constant, resulting in little to no change in driver demand, adjusting engine operating parameters at 522 may be to a lesser magnitude and/or extent than at 520. As such, increasing the threshold SOC limit when vehicle operator behavior has not changed may be less than the increase when the vehicle operator behavior has changed. As an example, the threshold SOC limit may increase to between 20 to 40%. In one example, the threshold SOC limit increases to 30%.

Additionally or alternatively, the method may further include extending an active time of the fuel pump. As an example, if a vehicle is recently shut-off, the fuel pump may be activated such that fuel is circulated from the fuel tank to the filter and other components of the fuel passages. This may delay fuel aging and occur when the engine is not firing. As such, the fuel pump activation may also occur during coasting events and start/stop, where engine combustion is not desired. In this way, the active time of the fuel pump is increased, thereby circulating a larger percentage of fuel in the fuel tank.

Thus, the methods of FIGS. 3, 4, and 5 illustrate a combination of methods for estimating a fuel aging of fuel in a fuel tank and vehicle adjustments, if any, in response to the estimated fuel aging. For example, if the fuel aging is less than a threshold aging, then the fuel quality may be sufficient such that a produced air/fuel ratio is substantially equal to an expected air/fuel ratio. However, if the fuel aging is greater than the threshold aging, then the fuel quality may be insufficient such that a produced air/fuel ratio may be greater than or equal to an expected air/fuel ratio. That is to say, an amount of fuel injected with fuel having a fuel age greater than the threshold aging may be less than an amount of fuel injected with fuel having a fuel age less than the threshold aging. This may be due to water content increasing in the fuel as its age increases.

In response to the fuel aging being greater than or equal to the threshold aging, the controller may signal to a vehicle infotainment system to display a variety of instructions to the vehicle operator. The instructions may include to consume fuel, perform a fuel tank fill-up, and/or to add one or more fuel additives to the fuel tank. Additionally or alternatively, the controller may adjust one or more engine operating parameters to adjust the air/fuel ratio to meet an expected air/fuel ratio. This may be performed by increasing a commanded fuel injection volume, decreasing mass air flow, and increasing canister purge. Additionally or alternatively, the controller may decrease fuel economy by increasing fuel consumption to assist the vehicle operator to perform the prompts. For example, if the vehicle is an automatic transmission, gear changes may occur at a higher engine RPM. For example, the higher engine RPM may include engine RPMs above 5,000, whereas gear changes when fuel aging is less than the threshold aging occur at engine RPMs less than 5,000. The adjustments and/or prompts may be removed and/or reset in response to the fuel aging falling below the threshold aging.

Turning now to FIG. 6, it shows a method 600 for determining if a fuel tank fill-up is occurring and if a fuel quality of the fuel being provided during the fill-up is available. As such, in some embodiments of the present disclosure, the method 600 may be used in conjunction with 502 of method 500. That is to say that in some examples, 502 of the method 500 may include some or all of the steps of method 600.

The method 600 begins at 602 where the method includes determining if a fuel tank fill-up is going to occur. This may be determined by monitoring if a sensor being arranged in a fuel tank nozzle, wherein the sensor may provide feedback if a fuel dispensing apparatus is inserted into the fuel tank nozzle. Additionally or alternatively, the fuel tank fill-up may be going to occur if a vehicle operator opens a fuel tank door. This may be further combined with a navigation system determining the current location of the vehicle being in a fuel station. Thus, the fuel tank fill-up is going to occur if the vehicle operator is one or more of at a fueling station, has opened the fuel tank door, and inserted a fuel dispensing apparatus into the fuel nozzle.

If the fuel tank fill-up is not occurring, then the method 600 may proceed to 604 where the method 600 may include maintain current operating parameters and does not reset a flag. Furthermore, the timer monitoring a time elapsed between fuel tank fill-ups continues to increase.

If the fuel tank fill-up is going to occur, then the method 600 may proceed to 606 where the method may include estimating a quality of fuel provided by the fuel station.

The method 600 may proceed to 608, where the method 600 may include determining if a fuel quality is available. As described above, the fuel quality may be obtained via the fuel station and information provided by other drivers. If the fuel quality is unavailable, then the method proceeds to 702 of FIG. 7 where the fuel quality may be determined onboard.

If the fuel quality is available, then the method 600 may proceed to 610 where the method may include determining if the fuel quality is greater than a threshold fill-up quality. The threshold fill-up quality may be a dynamic value, adjusted in response to a current fuel aging. For example, if the current fuel aging increases and fuel in the fuel tank is becoming less potent, then the threshold fill-up quality may increase, thereby demanding the vehicle operator to dispense a higher quality fuel in the fuel tank. Inversely, if the current fuel aging decreases or is less than the threshold aging, then the threshold fill-up quality may also decrease. Additionally or alternatively, the threshold fill-up quality may be a fixed value. In one example, the fixed value is representative of a national average fuel quality.

If the fuel quality is greater than the threshold fill-up quality, then the method 600 may proceed to 612 where the method 600 alerts the driver to dispense fuel into the fuel tank and reset the flag. The alerts may include one or more of a message being displayed on the infotainment system, an email, a phone call, and a text. The alert may further include a beep or other audible noise notifying the driver to begin dispensing fuel. Additionally or alternatively, a mechanism may be arranged in the fuel tank nozzle, wherein the mechanism may interact with the fuel dispensing apparatus such that fuel may begin dispensing into the fuel tank.

If the fuel quality is not greater than the threshold fill-up quality, then the method 600 may proceed to 614 to alert the driver of the fuel quality and provide one or more suggestions. The suggestions may include avoiding refueling at the present fuel station. Additionally or alternatively, the alert may include a minimum amount of fuel needed from the present fuel station to propel the vehicle to a nearest fuel station having fuel of a fuel quality greater than the threshold fill-up quality.

Figure 7:
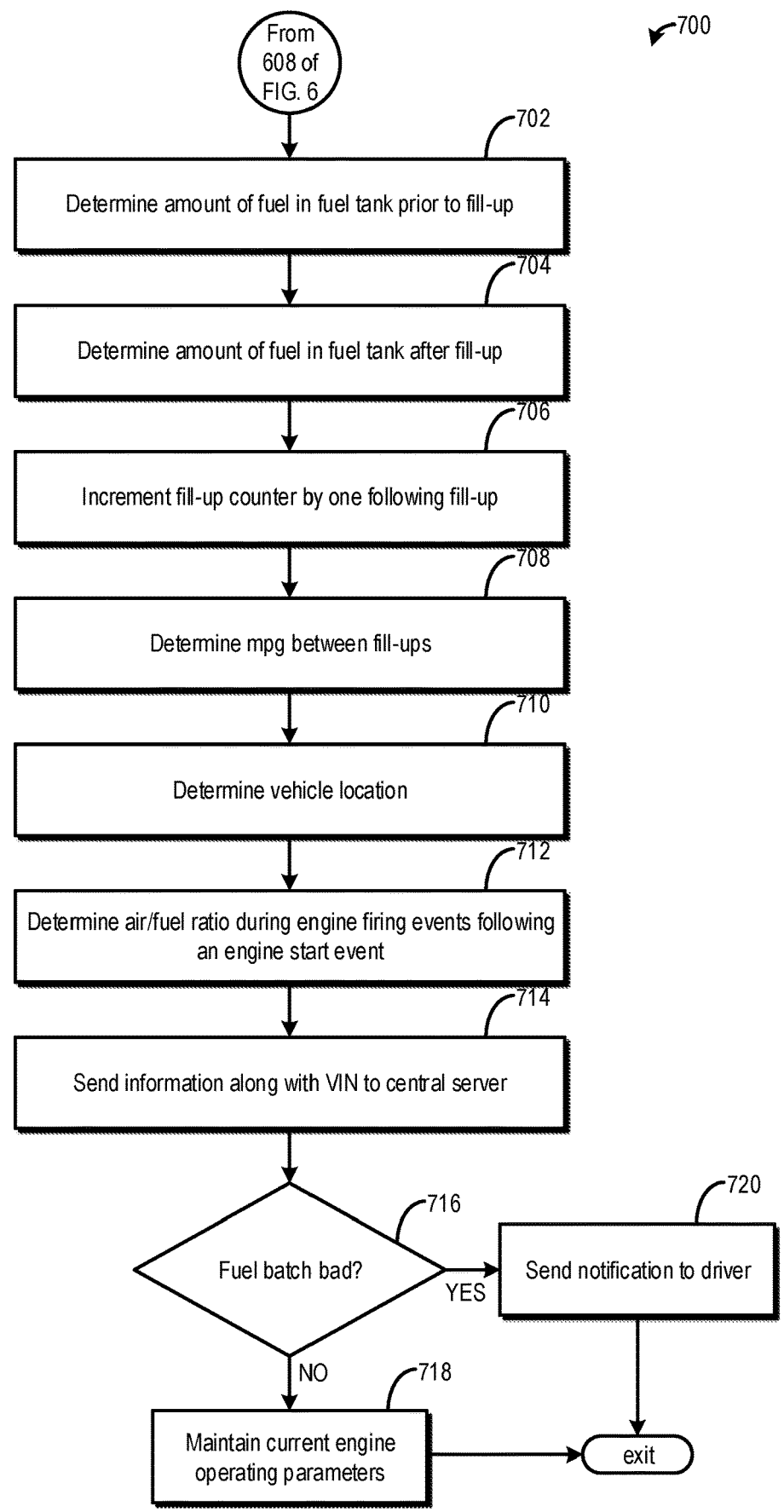
Figure 8:
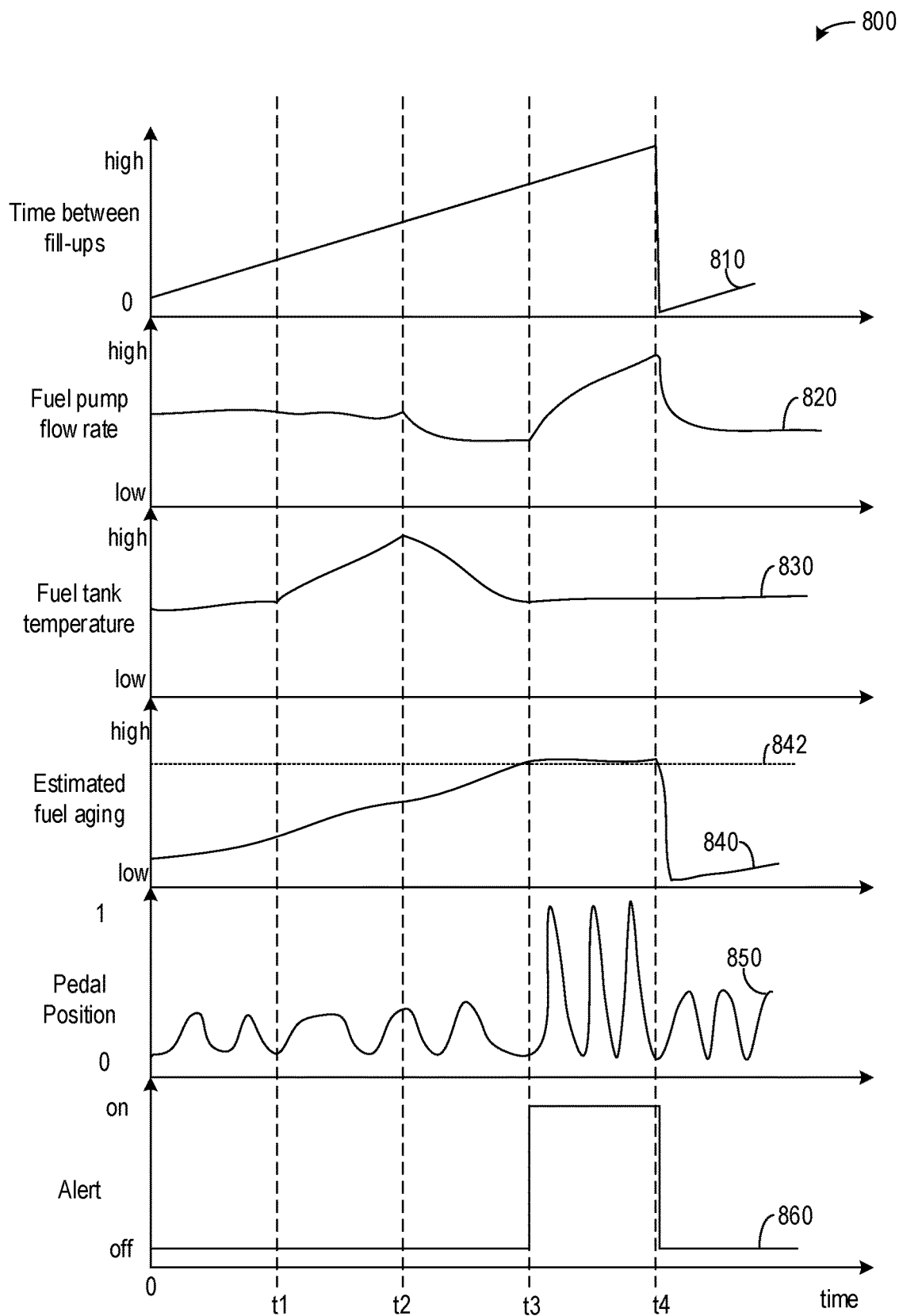
FIG. 8 shows an engine operating sequence graphically illustrating the methods of FIGS. 3 to 5.

Turning now to FIG. 7, it shows a method 700 for determining a composition of fuel newly added to a fuel tank, storing a location where the new fuel was received, and marking the location if the new fuel quality is lower than a threshold quality, sending the stored location to a central server, and receiving an alert from the central server of other locations where fuel quality is lower than the threshold quality, the other locations provided by other vehicles to the central server. The alert is delivered via text, email, voice call, and in-vehicle messaging system. To avoid a fill-up with fuel lower than a threshold quality, the central server may alert a vehicle operator to refuel at a nearest fueling station providing fuel above the threshold quality if a distance between the nearest fueling station and a next fueling station, providing fuel above the threshold quality, is less than a driving distance based on a current amount of fuel in the vehicle. The method 700 may further include adjusting engine operating parameters based on the new fuel quality being lower than the threshold quality. The adjusting may include decreasing EGR flow, increasing fuel injection pressure, advancing an injection timing, increasing an injection quantity, and decreasing an air/fuel ratio. The injection may include one or more of a primary (e.g., pilot) injection and a post-injection (e.g., injection following compression stroke and/or ignition). Marking the location may further include displaying a message to not refuel at a fueling location that previously provided fuel lower than the threshold quality.

Method 700 begins at 702, which includes determining an amount of fuel in the fuel tank prior to the fuel tank fill-up event. In one example, the amount of fuel may be determined as a percentage. The percentage may be calculated based on feedback from a volume (e.g., fuel level sensor) and/or mass sensor coupled to an interior of the fuel tank. Alternatively, the percentage may be estimated based on a number of miles driven since a previous fuel tank fill-up. In this way, the miles driven along with altitude changes, auxiliary components being activated (e.g., A/C active), drag and/or resistance, and other factors altering miles driven per gallon may be used to determine the percentage.

At 704, the method 700 may determine an amount of fuel in the fuel tank following the fuel tank fill-up event. Additionally or alternatively, an amount of fuel added to the fuel tank may be determined by calculating a difference between the amount of fuel in the fuel tank after the fuel tank fill-up event and the amount of fuel in the fuel tank before the fuel tank fill-up event.

At 706, the method 700 increments a fill-up counter by one. As such, a total number of fill-ups may be tracked during a lifespan of the vehicle. Additionally or alternatively, the fill-up counter may measure a total amount of fuel added to the fuel tank. As such, a number of fill-ups and an amount of fuel added to the fuel tank may be measured during a lifespan of a vehicle.

At 708, the sub-routine 700 includes determining miles per gallon between fill-ups. This may be calculated by comparing a number of miles driven to an amount of fuel consumed since the previous fuel tank fill-up event and the current fuel tank fill-up event.

In one example, a current miles per gallon between fill-ups may be compared to a previous miles per gallon between fill-ups. Alternatively, the current miles per gallon between fill-ups may be compared to an average of all the previous miles per gallon between fill-ups. On the other hand, the current miles per gallon between fill-ups may be compared to an estimated miles per gallon tracked by an odometer. If the current miles per gallon between fill-ups is a threshold difference less than the average or the previous miles per gallon between fill-ups, then a controller may inform a central server. Additionally or alternatively, the central server may be informed of a miles per gallon decrease in response to the current miles per gallon being less than the average or previous miles per gallon for a threshold number of successive times. For example, if the current miles per gallon is less than the average or previous miles per gallon after three consecutive fill-up events, then the central database may be notified of the decrease in miles per gallon. The central server may signal to the controller to inform the vehicle owner via a prompt on a vehicle infotainment system that the vehicle is driving fewer miles per gallon than expected and that vehicle servicing may be desired. Additionally or alternatively, the central server may signal to the controller to adjust engine operating conditions in response to the degradation. In one example, adjusting engine operating conditions includes the controller signaling to reduce cabin cooling by adjusting actuators of an air/conditioning unit and/or fan to flow less air into a vehicle cabin.

In some examples, additionally or alternatively, fuel economy for ethanol or biodiesel content, which could be obtained either from estimations based on the exhaust sensor and/or in-cylinder pressure sensor (ICPS) or from information provided from the fuel pump may be used to adjust miles per gallon between fill-ups. In this way, the current miles per gallon may be adjusted to account for ethanol and/or biodiesel in the fuel. As one example, the adjusting includes increase the current miles per gallon as the ethanol and/or biodiesel content in the fuel increases. Fuel economy may further be adjusted by accounting for fuel quality, where fuel quality may include an octane rating, water content, concentration contaminants, etc.

It will be appreciated that in some example of the method 700, steps 30 and 308 may be omitted and a manufacturer's average fuel economy may be used instead. Additionally or alternatively, an onboard average fuel economy may be used, wherein the onboard average fuel economy illustrates an average fuel economy of a vehicle operator current operating the vehicle. It will be appreciated that the vehicle may be operated by different vehicle operators at different moments in time. As such, if a vehicle comprises more than one vehicle operator during its lifespan, the vehicle may determine which of its vehicle operators is current operating the vehicle. This may be determined based on driver seat settings (e.g., weight, height, etc.), cellular device connected to the vehicle, and a prompt on the infotainment system asking the vehicle operator to select a vehicle operator from a list of known vehicle operators. By utilizing a determined average fuel economy associated with a specific vehicle operator, a more accurate determination of fuel quality may be calculated.

At 710, the method 700 includes determining a location of the vehicle. This may further include determining an address of a fuel station at which the vehicle received fuel from the current fuel tank fill-up. The location may be determined via GPS, phone, navigation system, etc. In one example, the phone may be wirelessly connected (e.g., Bluetooth) to the vehicle. As such, the vehicle may request a current location from the phone without a user input and/or action.

At 712, the method 700 determines an air/fuel ratio during engine firing events following an engine start event. Events outside the engine start event include engine firings occurring after a target engine speed is reached and a successful cylinder combustion occurred. The air/fuel ratio may be determined by an exhaust gas sensor in an exhaust passage fluidly coupled to an engine. In some examples, the air/fuel ratio may be based on a fuel quality of the fuel injection determined by the ICPS. As such, the air/fuel ratio may decrease (e.g., more rich) as an octane rating of the injected fuel increases.

At 714, the method 700 includes sending the information gathered above along with a vehicle identification number (VIN) to the central server. The central server may store, analyze, and process the data. In one example, this may include comparing the data received from the vehicle to data received from other similar vehicles (e.g., model, age, mileage, location, usage, etc.). Furthermore, the data may be compared to similar vehicles in similar conditions (e.g., cold-weather, altitude, rain, etc.). As an example, a vehicle in Portland, Oreg. may be compared to a vehicle in Detroit, Mich. if weather and other external conditions (e.g., altitude) are similar.

At 716, the method 700 includes determining if the fuel batch from the current fuel tank fill-up is bad. The fuel may be bad if it does not meet vehicle specifications (e.g., too dilute, too rich, etc.) Additionally or alternatively, the fuel batch may be bad if it is the wrong type of fuel (e.g., diesel in a spark ignited vehicle). The fuel composition may be measured by a fuel composition sensor which may detect amounts of different constituents in the fuel. As an example, the controller may determine if the newly added fuel batch is bad by comparing a composition of the fuel in the fuel tank prior to and after the fuel tank fill-up to a threshold fuel composition. Alternatively, the fuel sensor may be located in a portion of the fuel tank such that it may measure a composition of incoming fuel prior to it combining with fuel already in the fuel tank. As such, the fuel sensor may directly determine if the incoming fuel is lower than the threshold quality (herein referred to as bad fuel). Additionally or alternatively, a composition of the fuel batch from the current fuel tank fill-up may be determined via an in-cylinder pressure sensor (ICPS), indicated mean effective pressure (IMEP), combustion phasing, peak pressure rise rate, peak pressure location, peak pressure rise location, and/or other suitable means.

If the fuel composition, of fuel entering the fuel tank or of fuel in the fuel tank after fill-up, is substantially similar (e.g., within 95%) to the threshold fuel composition, then the method 700 proceeds to maintain current engine operating parameters and does not send a notification to the driver at 718.

If the fuel composition is not equal to the threshold fuel composition, then the method 700 proceeds to send a notification to the driver at 720. This may include the controller sending a message to the driver via text, email, phone call, and/or an updated display on a vehicle infotainment system. The method may further include memorizing the locations in which the vehicle received bad fuel. In one example, where a driver is operating the vehicle and requests a navigation system to locate one or more gas stations for a fuel tank fill-up, the controller may flag locations where the vehicle has received bad fuel. Alternatively, the controller may not display these locations in response to the request to locate gas stations. In some examples, the central server may notify other vehicles when within a threshold range (e.g., 50 miles) of locations providing bad fuel. In this way, a vehicle operator may avoid fueling stations with bad fuel. Additionally or alternatively, the method 700 may further include determining if the fuel composition deviation from a desired fuel composition may degrade the engine. If the bad fuel batch is capable of degrading the engine, then the subroutine 300 may include adjusting engine operations, where the adjusting may include applying derates, limit torque, providing driving coaching tips, signal for help, provide a list of contacts (e.g., towing company, cab, etc.).

In some examples, if the fuel station is in a remote location and the vehicle is demanding fuel due to a volume of fuel in the fuel tank being low, then the controller may alert the driver of the bad fuel along with a distance between the fuel station and a nearest fuel station on a designated travel path. For example, a driver may input a destination into a navigation system. While driving, the vehicle may deplete the fuel in the fuel tank, and thus, demand fuel. The vehicle operator may approach a fuel station known to the central server to provide bad fuel. In one example, the central server may signal to the controller to display and/or send an alert to the vehicle operator (e.g., indicating "Fuel station is bad. Consider filling fuel tank at a different location.") notifying them of the bad fuel along with a list of other fueling station nearest to a current location and deviating the least from a current travel path. As another example, the controller may predict when the fuel tank will demand fuel and notify the vehicle operator to perform a fuel tank fill-up prior to the demand to avoid filling at a fuel station providing bad fuel. In this way, the vehicle operator is near a fuel station providing acceptable fuel and does not have sufficient fuel to drive to the next nearest fuel station providing acceptable fuel. As such, the controller may avoid bad fueling stations by measuring a mileage remaining, based on fuel in the fuel tank, and from information regarding fuel quality at fuel stations from the central server.

Turning now to FIG. 8, it shows an engine operating sequence 800 graphically displaying one or more of the methods of FIGS. 3 through 5. The engine operating sequence 800 may include a plot 810 illustrating a time elapsed between fuel tank fill-ups, a plot 820 illustrating a fuel pump flow rate, a plot 830 illustrating a fuel tank temperature, a plot 840 illustrating an estimating fuel aging and dashed line 842 representing a threshold fuel aging, a plot 850 illustrating accelerator pedal position, and a plot 860 illustrating a status of an alert being displayed to a vehicle operator. Time is shown on a horizontal axis of the engine operating sequence 800 and increases from a left to a right side of the figure.

Prior to t1, the time between fill-ups (plot 810) is increasing. The fuel pump flow rate (plot 820) and the fuel tank temperature (plot 830) remain substantially constant. The estimated fuel aging (plot 840) increases at a first rate toward the threshold fuel aging (dashed line 842) as some amount of fuel in the fuel tank remains unused and uncirculated. The pedal position (plot 850) is shown oscillating from a first extreme position, indicated by "0", to a different position between the first extreme position and a second extreme position, indicated by "1". The first extreme position may correspond to a fully inclined position of the pedal, wherein the pedal is not depressed. Furthermore, the first extreme position may correspond to a fully closed throttle position, where driver demand is substantially zero. Thus, the second extreme position may correspond to a fully depressed position of the pedal, wherein the pedal may be pressed as close to a floor of the vehicle as possible. Thus, driver demand may be highest in the second extreme position and a throttle may be wide-open. An alert and/or message and/or prompt is not displayed to the driver (plot 860). As shown, the vehicle operator behavior where the estimated fuel aging is less than the threshold fuel aging and no alerts are displayed corresponds to the pedal position being gradually adjusted. At t1, the fuel tank temperature begins to decrease toward a high fuel tank temperature. This may result in condensate collecting on interior surfaces of the fuel tank, which may be cooler than fuel and air arranged within the fuel tank. As such, a dilution of the fuel may occur and fuel aging may increase.

Between t1 and t2, the estimated fuel aging increases at a second rate. The second rate may be greater than the first rate in some examples. Additionally or alternatively, the second rate may be substantially equal to the first rate prior to t1. The fuel pump flow rate remains substantially constant and the time between fuel tank fill-ups continues to increase. At t2, the fuel tank temperature begins to decrease, which may result in less condensate forming on interior surfaces of the fuel tank. The fuel pump flow rate begins to decrease, which may result in less fuel from the fuel tank passing through a filter, thereby increasing an estimated fuel aging.

Between t2 and t3, the fuel pump flow rate may decrease toward a relatively low fuel pump flow rate. As a result, the estimated fuel aging may increase at a third rate. In one example, the third rate is substantially equal to the second rate and greater than the first rate. As another example, the third rate may be greater than or less than the second rate, while being greater than the first rate. As a further example, the third rate may be substantially equal to each of the first and second rates. The fuel tank temperature may decrease away from the relatively high fuel tank temperature. At t3, the estimated fuel aging may be greater than the threshold fuel aging. In response, an alert is sent to a driver alerting them to perform a fuel tank fill-up, consume the overly aged fuel, and/or add one or more additives to the fuel tank, as described above. Additionally or alternatively, a controller may adjust one or more engine operating parameters to assist the driver to increase fuel consumption and/or maintain or decrease the estimated fuel aging. As described above, during transient events, the electric motor power output may decrease during transient engine operating conditions, thereby increasing fuel consumption.

Between t3 and t4, the vehicle operator heeds the alert and begins to more erratically press against the accelerator pedal. The vehicle operator may depress the pedal further and adjust a position of the pedal more aggressively such that fuel consumption may increase relative to consumption prior to t3. In combination, the fuel pump flow rate is increased to a relatively high fuel pump flow rate to prevent the estimated fuel aging from further increasing. By increasing the fuel pump flow rate to the relatively high fuel pump flow rate, more fuel from the fuel tank may pass through the filter, which may remove water and other particulates from the fuel. This in combination with the engine adjustments and driver behavior adjustments above, may prevent fuel aging from increasing further above the threshold fuel aging.

At t4, a fuel tank fill-up may occur and the time between fill-ups may return to 0. After t4, the estimated fuel aging may return to a relatively low fuel aging, below the threshold fuel aging, as the fuel from the fuel tank fill-up mixes with the overly aged fuel. The driver prompts may be removed and engine operating parameters may return to parameters corresponding to engine conditions when the estimated fuel aging is less than the threshold fuel aging. The vehicle operator may return to their normal operating behavior, such as the behavior prior to t3, to decrease fuel consumption.

In this way, combustion stability and vehicle performance may be maintained in response to a fuel aging being greater than or equal to a threshold aging by adjusting one or more engine operating parameters and prompting the vehicle operator to perform one or more tasks. The technical effect of estimating the fuel aging is to mitigate engine degradation due to low quality fuel (e.g., fuel aged greater than or equal to the threshold aging). By doing this, vehicle longevity may be increased.

An embodiment of a method comprises alerting a vehicle operator to adjust driving behavior and adjusting one or more engine operating parameters in response to an estimated fuel aging being greater than a threshold fuel aging. A first example of the method further includes where alerting includes one or more of displaying a message via an infotainment system, sending a text to a cellular device belonging to the vehicle operator, calling the cellular device belonging to the vehicle operator, and emailing the vehicle operator. A second example of the method, optionally including the first example, further includes where adjusting one or more engine operating parameters includes decreasing an air/fuel ratio, increasing fuel injection volume, and increasing engine speed prior to a gear shift. A third example of the method, optionally including one or more of the first and second examples, further includes where adjusting driving behavior includes alerting the vehicle operator to consume fuel comprising the estimated fuel aging being greater than the threshold fuel aging, wherein the threshold fuel aging is based on an average fuel economy. A fourth example of the method, optionally including one or more of the first through third examples, further includes where alerting the vehicle operator to consume fuel includes instructions to perform one or more of harder tip-ins, higher engine RPM prior to gear change, and driving farther. A fifth example of the method, optionally including one or more of the first through fourth examples, further includes where alerting the vehicle operator further comprises instructing the vehicle operator to perform a fuel tank fill-up. A sixth example of the method, optionally including one or more of the first through fifth examples, further includes where the instructing includes providing a list of nearby fuel stations. A seventh example of the method, optionally including one or more of the first through sixth examples, further includes where the alerting further comprises instructing the vehicle operator to dispense at least one of a plurality of fuel additives to a fuel tank. An eighth example of the method, optionally including one or more of the first through seventh examples, further includes where the instructing further includes displaying a list of nearby locations selling at least one of the plurality of fuel additives.

An embodiment of a system comprises an engine comprising a fuel rail fluidly coupled to a fuel tank via a fuel passage, and a controller with computer-readable instructions stored on non-transitory memory thereof that when executed enable the controller to estimate a circulation percentage of fuel in the fuel tank and calculate a fuel aging of uncirculated fuel in the fuel tank based on the circulation percentage, temperature, and time elapsed since a previous fuel tank fill-up. A first example of the system, further includes where the controller further comprises instructions for estimating the circulation percentage based on a flow rate of a fuel pump, wherein the fuel pump pumps fuel from the fuel tank to the fuel passage. A second example of the system, optionally including the first example, further includes where the controller further comprises instructions for intrusively activating the fuel pump in response to the fuel aging being greater than a threshold fuel aging, wherein intrusively activating the fuel pump includes activating the fuel pump during non-combustion engine operating parameters. A third example of the system, optionally including the first and/or second examples, further includes where the time elapsed is reset upon a fuel tank fill-up providing fuel having a fuel quality greater than a threshold fuel quality. A fourth example of the system, optionally including one or more of the first through third examples, further includes where the threshold fuel quality is a dynamic value proportionally based on the fuel aging. A fifth example of the system, optionally including one or more of the first through fourth examples, further includes where the fuel passage comprises a filter.

An embodiment of a method comprises estimating a fuel recirculation factor based on a time elapsed since a previous fuel tank fill-up and a fuel circulation percentage and calculating a fuel aging based on the fuel recirculation factor, a current fuel quality, and a temperature of uncirculated fuel. A first example of the method further includes where the fuel circulation percentage is based on a volume of a fuel tank, a volume of fuel in the fuel tank, and a flow rate of a fuel pump fluidly coupling the fuel tank to a fuel passage, and where the fuel passage leads to a fuel rail coupled to fuel injectors of an engine. A second example of the method, optionally including the first example, further includes where the current fuel quality is estimated based on an initial quality of fuel, wherein the initial quality of fuel is provided by a fuel station, by a central server configured to receive information regarding fuel quality from various vehicles, or by onboard diagnostics determining air/fuel ratios during engine firing events following an engine start subsequent a fuel tank fill-up. A third example of the method, optionally including the first and/or second examples, further includes where displaying a plurality of suggestions to a vehicle operator in response to the initial quality of fuel being less than a threshold quality of fuel, wherein the threshold quality of fuel is proportionally based on the fuel aging. A fourth example of the method, optionally including one or more of the first through third examples, further includes where the fuel aging is recalculated in response to a fuel tank fill-up event.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   estimating a fuel recirculation factor based on a product of a time elapsed since a previous fuel tank fill-up and a fuel circulation percentage, wherein the fuel circulation percentage is based on a current amount of fuel residing in the fuel tank and a flow rate of a fuel pump fluidly coupling a fuel tank to a fuel passage;
   calculating a fuel aging based on the fuel recirculation factor, a current fuel quality, and a temperature of fuel in the tank; and
   alerting a vehicle operator in response to the current fuel quality being less than a threshold quality of fuel.

2. The method of claim 1, wherein the fuel circulation percentage is further based on a volume of the fuel tank, a volume of fuel in the fuel tank, an amount of fuel being pumped from the fuel tank into the fuel rail, a volume of fuel not being pumped out of the fuel tank, and a volume of fuel consumed by an engine, wherein the fuel passage leads to a fuel rail coupled to fuel injectors of the engine, and wherein the fuel pumped from the fuel tank into the fuel rail does not include fuel consumed by the engine.

3. The method of claim 1, wherein the current fuel quality is estimated based on an initial quality of fuel, wherein the initial quality of fuel is provided by a fuel station, by a central server configured to receive information regarding fuel quality from various vehicles, or by onboard diagnostics determining air/fuel ratios during engine firing events following an engine start subsequent a fuel tank fill-up.

4. The method of claim 3, further comprising in response to the initial quality of fuel being less than the threshold quality of fuel, displaying a plurality of suggestions to the vehicle operator to avoid fuel stations with the initial quality of fuel being less than the threshold quality of fuel, wherein the threshold quality of fuel is proportionally based on the fuel aging.

5. The method of claim 1, wherein the fuel aging is recalculated in response to a fuel tank fill-up event.

6. The method of claim 1, wherein the fuel recirculation factor refers to an amount of fuel in the fuel tank which has been circulated since the previous fuel tank fill-up.

* * * * *